United States Patent [19]
Mantelet

[11] 3,912,176
[45] Oct. 14, 1975

[54] MANUALLY OPERATED KITCHEN GRATER

[75] Inventor: Jean Mantelet, Paris, France

[73] Assignee: Societe Anonyme Moulinex, Bagnolet, France

[22] Filed: June 10, 1974

[21] Appl. No.: 477,747

[30] Foreign Application Priority Data
June 22, 1973  France .............................. 73.22809

[52] U.S. Cl. ................................................ 241/93
[51] Int. Cl.² .......................................... A47J 43/25
[58] Field of Search...... 241/91, 93, 169.1, 199.1 L, 241/278 R, 278 A

[56] References Cited
UNITED STATES PATENTS

| | | | |
|---|---|---|---|
| 913,187 | 2/1909 | Arnstein | 241/93 |
| 2,137,366 | 11/1938 | Sundstrand | 241/93 |

FOREIGN PATENTS OR APPLICATIONS

| | | | |
|---|---|---|---|
| 635,676 | 4/1950 | United Kingdom | 241/93 |
| 789,417 | 10/1935 | France | 241/93 |

Primary Examiner—Granville Y. Custer, Jr.
Attorney, Agent, or Firm—Young & Thompson

[57] ABSTRACT

A manually operated kitchen grater has a perforated drum of sheet steel to which is secured a crank of molded plastic. The crank has an integral annular hub comprised by inner and outer concentric flanges to the inner of which is secured one end of the drum. For this purpose, the sheet steel of the drum is folded to form an abutment spaced from one edge, and that one edge is then rolled over the inner flange of the hub and secured by deformation at a plurality of peripherally spaced points. The crank terminates outwardly in a handle. Such a grater can be housed in a plastic housing, which it will accordingly match.

3 Claims, 5 Drawing Figures

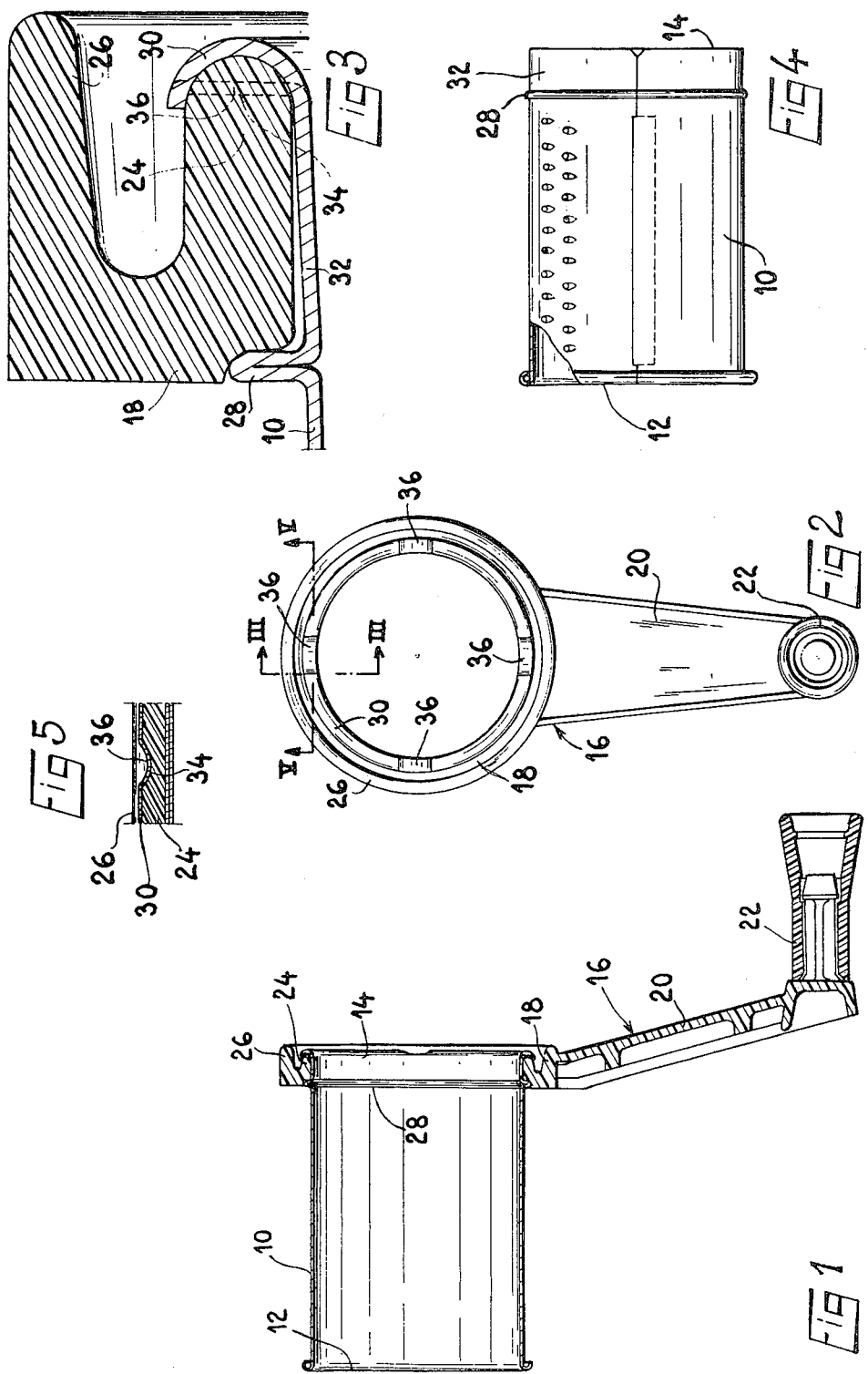

MANUALLY OPERATED KITCHEN GRATER

The present invention relates to manually operated kitchen graters, for example cheese graters, of the type in which a cylindrical sleeve open at its ends is secured to an outwardly extending crank that terminates at its end in a handle.

The invention is of particular utility in connection with graters of the type disclosed in French Pat. No. 75,45382, Dec. 20, 1972, in which a casing for receiving the drum is of plastic material. In such a grater, until the advent of the present invention, the assembly of the drum and crank was made of metal, because plastic materials are not suitable for providing a grater which is both effective and resistant to wear. Unfortunately, the appearance of such a grater suffers from the diversity of the materials used in the casing and in the crank.

It is an object of the present invention to overcome this disadvantage.

Another object of the present invention is to provide a grater which will be relatively simple and inexpensive to manufacture and assemble, and rugged and durable in use.

Briefly stated, the objects of the present invention are achieved by providing a grater in which the drum is metallic but the crank and the hub by which the crank is attached to the drum are of a single piece of molded plastic.

Other objects, features and advantages of the present invention will become apparent from a consideration of the following description, taken in connection with the accompanying drawing, in which:

FIG. 1 is a view partially in cross section of an assembly of drum and crank according to the present invention;

FIG. 2 is a right-side view of the structure of FIG. 1;

FIG. 3 is an enlarged fragmentary cross-sectional view on the line III—III of FIG. 2;

FIG. 4 shows the drum alone before assembly to the crank; and

FIG. 5 is a fragmentary cross-sectional view on the line V—V of FIG. 2.

Referring now to the drawing in greater detail, there is shown a grater according to the present invention, for use with a casing which may be of the type of the above-identified French patent, comprising a perforated drum 10 having the form of a cylinder open at its ends 12 and 14 and driven in rotation by a crank 16 comprising an annular hub 18 fixed to end 14 of the drum and having an arm 20 carrying a handle 22.

According to the invention, although the drum 10 is sheet steel, the hub 18 and the arm 20 are a single molded piece of plastic which is subsequently assembled to the drum.

The hub 18 is in the form of a ring which is U-shaped in cross section and comprises two coaxial inner and outer annular flanges 24 and 26, respectively. This ring is applied against the external surface of the drum and is fixed rigidly to the drum. To this end, as will be seen in FIG. 3, the ring is imprisoned between a circular shoulder 28 constituted by an outwardly extending bent flange of the sheet metal of the drum, and a collar 30 formed by rolling the edge 32 of the drum from its FIG. 4 condition to the condition shown in FIG. 3, until edge 32 encloses the free edge of the flange 24.

To fix the ring and the drum against rotation relative to each other, flange 24 has four recesses 34 in its outer edge which receive four teeth 36 on collar 30, which teeth 36 may for example be formed by local deformation of collar 30.

There is thus obtained a crank-drum assembly which not only is aesthetically pleasing when used in association with a plastic housing for a grater, but also has desirable rigidity and can be manufactured simply, cheaply and by mass production.

From a consideration of the foregoing disclosure, therefore, it will be evident that the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

I claim:

1. A manually operated grater comprising a cylindrical drum of metal which is open at its ends and which has a circular outwardly directed flange on one of its edges, and a plastic hub in the form of a ring fixed to said circular flange and integral with a crank arm extending outwardly from the ring and terminating in a handle, the drum having a circular outwardly directed shoulder spaced from said circular flange, and the ring engaging the outer periphery of the drum between the shoulder and the flange, said ring having peripherally spaced recesses thereon and said flange having protuberances that engage in said recesses thereby to fix the drum and ring against rotation relative to each other.

2. A grater as claimed in claim 1, said drum being of sheet metal, said shoulder comprising a folded portion of said sheet metal, and said protuberances of the flange comprising local deformations of said sheet metal.

3. A grater as claimed in claim 2, said ring being of U-shaped cross section having two axially directed inner and outer ribs, said inner rib being applied between the shoulder and the flange of the drum, said flange of the drum being rolled on the free edge of said inner rib, and said recesses of the ring being disposed on said free edge of said inner rib.

* * * * *